US008768985B2

(12) United States Patent
Kusko et al.

(10) Patent No.: US 8,768,985 B2
(45) Date of Patent: *Jul. 1, 2014

(54) AUTOMATED FILE RELOCATION

(75) Inventors: Mary P. Kusko, Hopewell Junction, NY (US); Frank E. Levine, Austin, TX (US); Stella L. Taylor, Las Vegas, NV (US); Anna W. Topol, Jefferson Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/369,012

(22) Filed: Feb. 8, 2012

(65) Prior Publication Data
US 2012/0143828 A1 Jun. 7, 2012

Related U.S. Application Data

(63) Continuation of application No. 12/329,797, filed on Dec. 8, 2008, now Pat. No. 8,176,105.

(51) Int. Cl.
*G06F 7/00* (2006.01)
*G06F 17/30* (2006.01)

(52) U.S. Cl.
CPC .............................. *G06F 17/30067* (2013.01)
USPC .......................... 707/828; 707/661; 707/665

(58) Field of Classification Search
CPC .................................................. G06F 17/30067
USPC ........................................ 707/661, 665, 828
See application file for complete search history.

(56) References Cited

U.S. PATENT DOCUMENTS

| 5,325,310 | A  | * | 6/1994  | Johnson et al. ............... 709/206 |
|-----------|----|---|---------|---------------------------------------|
| 6,249,807 | B1 |   | 6/2001  | Shaw et al.                           |
| 6,282,565 | B1 |   | 8/2001  | Shaw et al.                           |
| 6,304,277 | B1 |   | 10/2001 | Hoekstra et al.                       |
| 6,380,951 | B1 |   | 4/2002  | Petchenkine et al.                    |
| 6,816,885 | B1 |   | 11/2004 | Raghunandan                           |
| 6,922,781 | B1 |   | 7/2005  | Shuster                               |
| 6,941,304 | B2 |   | 9/2005  | Gainey et al.                         |
| 6,992,686 | B2 |   | 1/2006  | Nagarajan                             |
| 7,003,551 | B2 |   | 2/2006  | Malik                                 |
| 7,136,981 | B2 |   | 11/2006 | Burch, Jr. et al.                     |
| 7,317,697 | B2 |   | 1/2008  | Lewis et al.                          |
| 7,882,212 | B1 | * | 2/2011  | Nappier et al. ............... 709/224 |
| 2001/0044804 | A1 |   | 11/2001 | Fitzgerald et al.                   |
| 2002/0120639 | A1 | * | 8/2002  | Basin et al. .................... 707/204 |
| 2002/0124014 | A1 |   | 9/2002  | Noguchi                             |
| 2004/0104947 | A1 | * | 6/2004  | Schmitt ......................... 345/859 |
| 2006/0075052 | A1 | * | 4/2006  | Oostendorp ................. 709/206 |
| 2006/0143714 | A1 |   | 6/2006  | Peterson et al.                     |

OTHER PUBLICATIONS

U.S. Appl. No. 12/329,797—Specification Filed Dec. 8, 2008.
U.S. Appl. No. 12/329,797—Non-Final Office Action Mailed Feb. 16, 2011.
U.S. Appl. No. 12/329,797—Notice of Allowance Mailed Jan. 5, 2012.

* cited by examiner

*Primary Examiner* — Cheyne D Ly
(74) *Attorney, Agent, or Firm* — John R. Pivnichny; Law Office of Jim Boice

(57) ABSTRACT

A processor-implemented method, system and/or computer program product for managing computer file storage is presented. A file, which is designated for storage, is received. Upon determining that the file exceeds a pre-determined size, the file is stored in a pre-designated folder that is reserved for oversized files. This pre-designated folder is protected such that any file stored within the pre-designated folder is prevented from being moved into archival storage.

18 Claims, 3 Drawing Sheets

| FILE MANAGEMENT PROGRAM | | | |
|---|---|---|---|
| File  Edit  View  Tools  Help | | | |
| Date ⌄ | Time | Size | Subject ⌃        204 |
| 02/27/20XX | 02:48 PM | 09,766,091 | 📎 Industry Skillmaps & Profiling Discussion |
| 08/17/20XX | 02:30 PM | 91,159.303 | 📎 Assessment Instructions |
| 08/17/20XX | 03:13 AM | 91,159.283 | 📎 Assessment Instructions |
| 08/17/20XX | 02:58 AM | 90,244.119 | 📎 Assessment Instructions |
| 08/29/20XX | 03:23 AM | 39,924.603 | 📎 Re Defect 990 - Incorrect SMB Data: Please Provide More Information |
| 08/22/20XX | 11:33 AM | 39,867.749 | 📎 Copy of W34 for Aug 21 |
| 08/22/20XX | 10:58 AM | 39,867.353 | 📎 Testing Call |
| 12/26/20XX | 11:37 AM | 39,708.674 | 📎 Fw: Emailing: Discovery Portfolio.swf, PM Training 3-10-06.htm, PM Training 3-10-06.swf Intro Training.htm, Discovery Intro Training.swf, Discovery Portfolio.htm |
| 10/26/20XX | 01:20 PM | 39,706.674 | 📎 Emailing: Discovery Portfolio.swf, PM Training 3-10-06.htm, PM Training 3-10-06.swf Intro Training.htm, Discovery Intro Training.swf, Discovery Portfolio.htm |
| 07/25/20XX | 09:43 AM | 28,104.785 | 📎 Re: Combined Distribution Lists |
| 03/23/20XX | 11:18 AM | 25,991.169 | 📎 Global PD Program Digital Binder TeamRoom - CCB Minutes for March 22, 20XX |

FIG. 2

AUTOMATED FILE RELOCATION

BACKGROUND

The present disclosure relates to the field of computers, and specifically to computer files. Still more particularly, the present disclosure relates to managing the storage of computer files.

In a typical computing environment, multiple users will share secondary memory found in a common storage device, such as a hard drive, tape drive, etc. Because of the finite capacity of such storage devices, many companies set limits on how much file space each employee/department is allowed, particularly when it comes to saving and filing documents on a daily basis. Multiple problems arise from such limitations. First, some employees will exceed the file space limitation faster than others. Second, some employees will fail to manage and purge files, thus reducing available space in the common storage device. Because of these problems, some Information Technology (IT) managers will periodically archive and/or purge files. However, such archiving/purging causes users to spend an inordinate amount of time retrieving files needed for current projects.

SUMMARY

A processor-implemented method, system and/or computer program product for managing computer file storage is presented. A file, which is designated for storage, is received. Upon determining that the file exceeds a pre-determined size, the file is stored in a pre-designated folder that is reserved for oversized files. This pre-designated folder is protected such that any file stored within the pre-designated folder is prevented from being moved into archival storage.

BRIEF DESCRIPTION OF SEVERAL VIEWS OF THE DRAWINGS

FIG. 2 illustrates a Graphical User Interface (GUI) displaying auto-selected files that are to be stored in a pre-defined storage folder that is reserved for oversized files.

DETAILED DESCRIPTION

Figure 1:
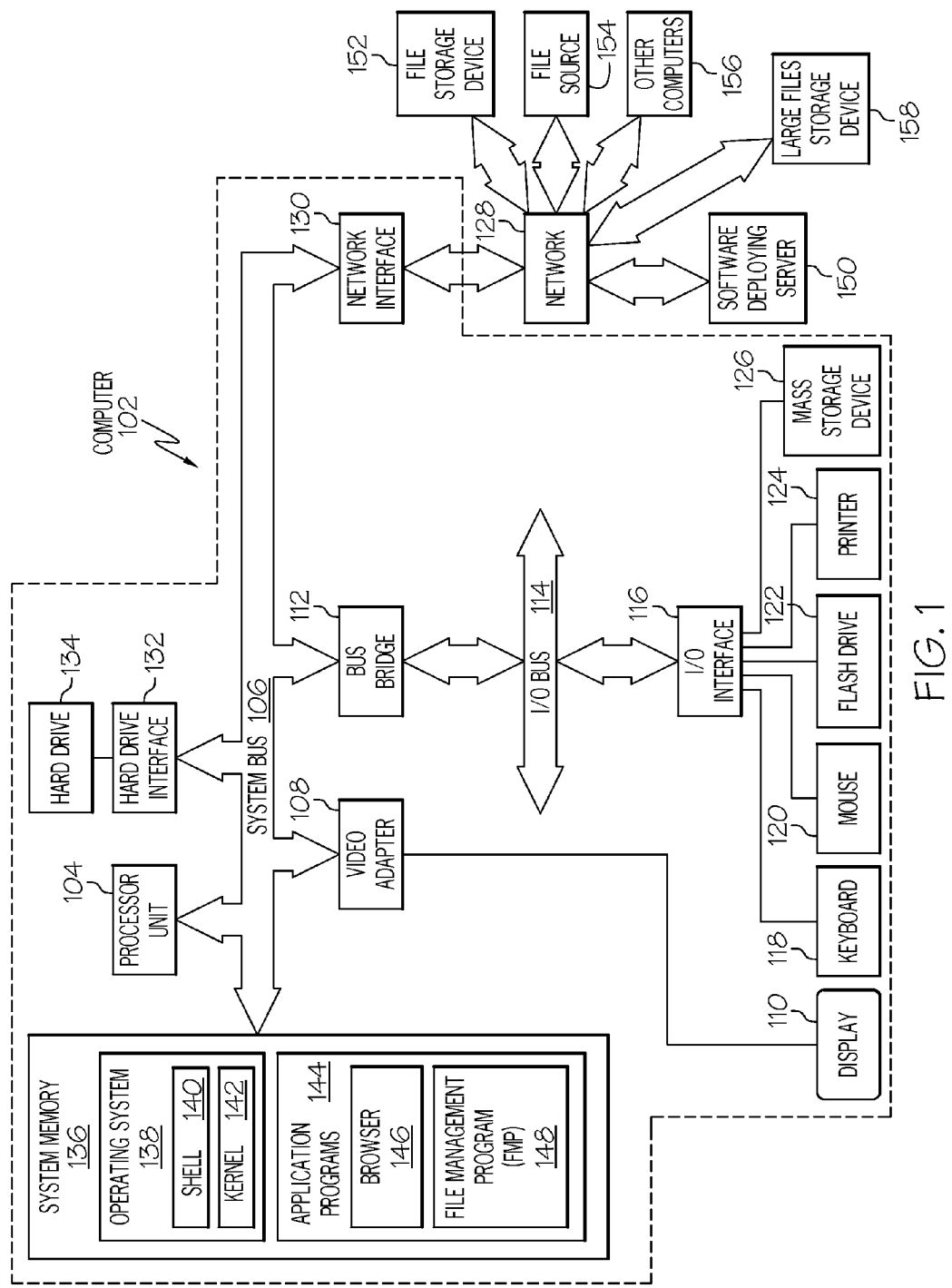
FIG. 1 depicts an exemplary computer which may be utilized by the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which the present invention may utilize. Note that some or all of the exemplary architecture shown for computer 102 may be utilized by software deploying server 150, file source 154, and other computers 156.

Computer 102 includes a processor unit 104, which may utilize one or more processors each having one or more processor cores, that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Flash Drive 122, a printer 124, and a mass storage device 126 (e.g., a CD-ROM drive, a tape drive, a large hard disk, etc.). The format of the ports connected to I/O interface 116 may be any known to those skilled in the art of computer architecture, including but not limited to Universal Serial Bus (USB) ports.

Computer 102 is able to communicate with a software deploying server 150 via network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a File Management Program (FMP) 148. FMP 148 includes code for implementing the processes described below, and particularly as described in FIGS. 2-3. In one embodiment, computer 102 is able to download FMP 148 from software deploying server 150, including in an on-demand basis. Note further that, in one embodiment of the present invention, software deploying server 150 performs all of the functions associated with the present invention (including execution of FMP 148), thus freeing computer 102 from having to use its own internal computing resources to execute FMP 148.

In a process described in further detail below, computer 102 is able to receive files from a file source 154. This file source 154 may be an e-mail server, another client computer on network 128, a graphics file provider, etc. The file storage device 152 and the large file storage device 158 are mass storage devices. Examples of such storage devices include, but are not limited to, an optical storage drive (e.g., a CD-ROM drive), a tape drive, a large-capacity hard drive (e.g., a multi-disk drive, a Redundant Array of Inexpensive Disks—RAID system, etc.), etc. Note that file storage device 152 and/or large files storage device 158 may be shared by multiple users, including those using computer 102 and other computers 156 that are coupled to network 128.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Referring now to FIG. 2, a Graphical User Interface 202 depicts multiple files that need to be stored. A pre-determined level has been set for files that are too large to be stored in a standard common storage folder, since they would appropriate too much of the folder's space. In the example shown in FIG. 2, these files are identified as any file larger than 40 megabytes, as shown within box 204. In accordance with the present invention, then, these identified files will be filed, with or without pre-compaction, in a specially designated folder that has been reserved for oversized files.

Figure 3:
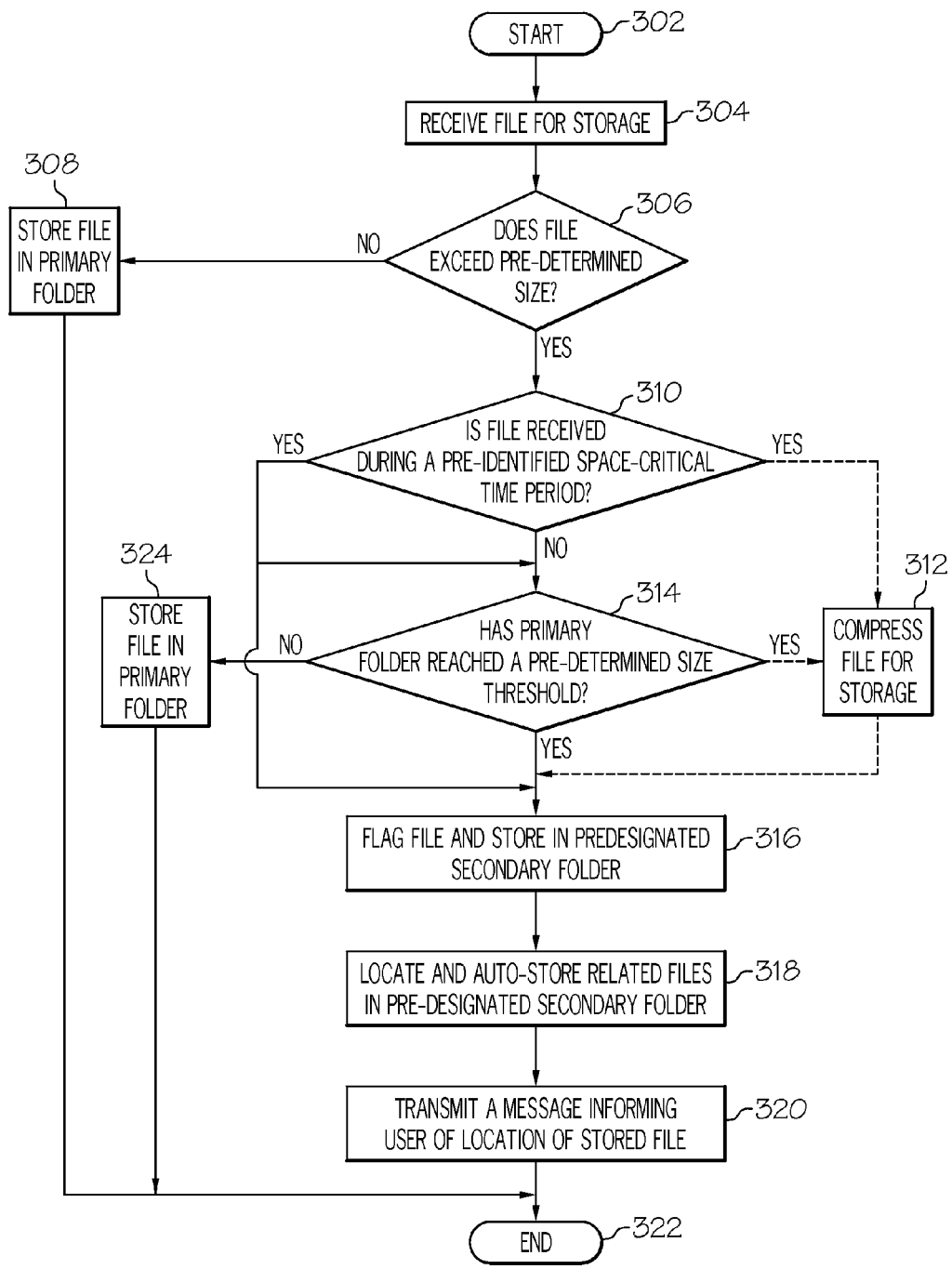
FIG. 3 is a flow-chart of exemplary steps taken to manage the storage of over-sized files.

Referring now to FIG. 3, a high-level flow chart of exemplary steps taken to manage the storage of oversized files is presented. After initiator block 302, a file is received for storage (block 304). This file may be received by receiving means, such as the network interface 130 and processor 104 shown in FIG. 1, which are able to execute instructions in FMP 148 that logically determine how the received file is to be stored. Alternatively, the file to be stored is simply a file that has been created by a user, but needs to be stored. In either scenario, the "received" file, which is destined for storage in accordance with any pre-determined criteria set by the receiver, sender, or system administrator, may be an e-mail, a text document, a graphics file, a spreadsheet, or any other data file. If the file does not exceed some pre-determined size (query block 306), then it is stored unaltered in a standard folder (block 308) that is located within some primary storage device. This primary storage device may be a partition within the file storage device 152 shown in FIG. 1 or the hard drive 134 shown in FIG. 1. This "small" file would not be stored in large file storage device 158, since that device is a storage drive that is dedicated to storing only oversized (larger than some pre-determined size) files, as described herein.

Returning to query block 306 in FIG. 3, if the received file is larger than some predetermined size (e.g., is more than 40 megabytes in size), then a query is made as to whether the file was received during some pre-identified space-critical time period (query block 310). This pre-identified space-critical time period may be determined by reviewing a historical usage of some primary storage drive and/or folder. For example, if this primary storage drive (e.g., file storage device 152 shown in FIG. 1) and/or folder (e.g., a primary folder to which files are stored by default when received or created) have a history of being heavily or excessively used to the point of becoming full during some particular day of the week or time of day, and the file is received/created for storage during this particular day of the week or time of day, then the file will be flagged and stored in some pre-designated secondary folder (block 316). This pre-designated secondary folder may be in a primary storage device (e.g., file storage device 152) or a secondary storage device (e.g., large file storage device 158). In one embodiment, the pre-designated secondary folder (or storage device) is reserved for the exclusive use of storing multiple oversized files, as have been pre-defined according to some minimum size to be deemed "oversized." Note also that, in one embodiment, the oversized file that is to be stored may first be compressed before being stored (block 312) in the pre-designated secondary folder.

Similarly, a determination is made as to whether the primary folder has reached some pre-determined size threshold (query block 314). For example, if the primary folder has reached 100 megabytes in size, then the newly arrived/created file may be stored in the pre-designated secondary folder (block 316), with (block 312) or without first being compressed. If the primary folder has not reached the pre-determined size threshold (query block 314), then the incoming file may simply be stored in the primary folder (block 324).

As described in block 316, if the file is of an excessive size, it is then flagged and stored in the pre-designated secondary folder. Note that the pre-designated secondary folder may be color-coded to indicate that it contains only oversized files. Alternatively, the pre-designated secondary folder can be designated and color coded to hold only files related to a particular department or user, projects that have a budget that exceeds a certain pre-determined value, etc. Note also that the pre-designated secondary folder can be protected, such that any file stored within the pre-designated secondary folder is classified as being a protected file that is automatically prevented (protected) from being moved into archival storage. Archived files are files that have been deemed to be inactive, and thus must be retrieved from an archived file (often located in a distant tertiary drive) within the memory hierarchy.

As described in block 318, other related files may also be stored in the pre-designated secondary folder. That is, other files that have a same prefix designation (e.g., files that have been tagged with a prefix to designate which project, team, department, geographical area, etc. that the file is associated with), files with a same suffix (e.g., any files identified as being a Portable Document Format file as identified by a .PDF suffix), files with a same name (e.g., file xxx.commonname.yyy.doc for any text document whose file name includes the term "commonname"), files that have been previously stored in the primary folder but that exceed the pre-determined size described in query block 306, files that are associated with any project that has a budget that exceeds a certain pre-determined cost value, or files that are specifically tagged and/or associated with the type/size/name of files stored in the pre-designated secondary folder may also be retrieved and stored in the pre-designated secondary folder.

As depicted in block 320, a message is transmitted to a user that certain files have been reassigned to the pre-designated secondary folder, even if done without the permission and/or knowledge of the user. For example, assume that, during the course of a workday, a user has created or received one or more files that exceed the pre-determined size described in block 306. While the user is away from her terminal, logic (e.g., FMP 148 shown in FIG. 1) may automatically relocate these files to the pre-designated secondary folder. The user would not know that this occurred, or where the files are now located, unless a message (e.g., a terminal message, an e-mail, etc.) is sent to the user, notifying the user that a relocation action has occurred, and telling the user where the files can now be found (including the file name, Uniform Resource Locator—URL, Lightweight Directory Access Protocol—LDAP folder location, or other address needed to locate the new pre-designated secondary folder). The process ends at terminator block 322.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described embodiments of the invention of the present application in detail and by reference to illustrative embodiments thereof, it will be apparent that modifications and variations are possible without departing from the scope of the invention defined in the appended claims.

What is claimed is:

1. A processor-implemented method of managing file storage, the processor-implemented method comprising:
   a processor receiving an electronic file that is designated for storage;
   the processor determining that the electronic file exceeds a pre-determined size, and the processor storing the electronic file in a pre-designated folder that is reserved for oversized electronic files, wherein in response to determining that the pre-designated folder has reached a pre-determined size, compressing the electronic file before storage in the pre-designated folder, and color-coding the pre-designated folder to indicate that only compressed electronic files are stored within the pre-designated folder, and wherein the pre-designated folder is protected such that any electronic file stored within the pre-designated folder is prevented from being moved into archival storage.

2. The processor-implemented method of claim 1, further comprising:
   the processor transmitting a message to a user that certain electronic files have been reassigned to the pre-designated folder for storage, wherein the message notifies the user that a relocation action has occurred, and wherein the message tells the user where the oversized electronic files are currently located.

3. The processor-implemented method of claim 2, wherein the message provides the user with a logical name and location of the pre-designated folder in which the oversized electronic files are stored.

4. The processor-implemented method of claim 1, wherein the pre-designated folder is reserved for electronic files that are common to a single job project.

5. The processor-implemented method of claim 4, further comprising:
   identifying and storing, in the pre-designated folder, any other electronic file that is associated with the single job project.

6. The processor-implemented method of claim 1, wherein the pre-designated folder is reserved for electronic files that are used by a single work group.

7. The processor-implemented method of claim 1, further comprising:
   compressing any electronic file that is identified by a pre-determined file name into a compressed identified electronic file; and
   storing said compressed identified electronic file in the pre-designated folder.

8. The processor-implemented method of claim 1, wherein the electronic file is an incoming e-mail.

9. The processor-implemented method of claim 1, wherein the electronic file is a text document.

10. The processor-implemented method of claim 1, wherein the electronic file is a graphics file.

11. The processor-implemented method of claim 1, further comprising:
    classifying the electronic file that exceeds the pre-determined size as a protected electronic file.

12. The processor-implemented method of claim 11, wherein the protected electronic file is defined as an electronic file that is associated with projects in a certain pre-defined geographical region.

13. The processor-implemented method of claim 11, wherein the protected electronic file is defined as an electronic file that is associated with a certain customer.

14. The processor-implemented method of claim 11, wherein the protected electronic file is defined as an electronic file that is associated with a project that has a budget that exceeds a certain pre-determined value.

15. The processor-implemented method of claim 11, wherein the protected electronic file is defined as an electronic file that contains security protection instructions for a computer that stores the pre-designated folder.

16. A computer program product for managing electronic file storage,
    the computer program product comprising:
    a non-transitory computer readable storage media;
    first program instructions to receive an electronic file that is designated for storage; second program instructions to determine that the electronic file exceeds a predetermined size; and third program instructions to store the electronic file in a pre-designated folder that is reserved for oversized electronic files, wherein in response to determining that the pre-designated folder has reached a pre-determined size, compressing the electronic file before storage in the pre-designated folder, and color-coding the pre-designated folder to indicate that only compressed electronic files are stored within the pre-designated folder, and wherein the pre-designated folder is protected such that any electronic file stored within the pre-designated folder is prevented from being moved into archival storage; and wherein the first, second, and third program instructions are stored on the non-transitory computer readable storage media.

17. The computer program product of claim 16, wherein the computer executable instructions are provided by a service provider to a customer's computing device in an on-demand basis.

18. A computer system comprising:
    a processor, a computer readable memory, and a computer readable storage media; first program instructions to receive an electronic file that is designated for storage;
    second program instructions to determine that the electronic file exceeds a predetermined size; and
    third program instructions to store the electronic file in a pre-designated folder that is reserved for oversized electronic files, wherein in response to determining that the pre-designated folder has reached a pre-determined size, compressing the electronic file before storage in the pre-designated folder, and color-coding the pre-designated folder to indicate that only compressed electronic files are stored within the pre-designated folder, and wherein the pre-designated folder is protected such that any electronic file stored within the pre-designated folder is prevented from being moved into archival storage; and wherein the pre-designated folder is protected such that any electronic file stored within the pre-designated folder is prevented from being moved into archival storage; and wherein the first, second, and third program instructions are stored on the computer readable storage media for execution by the processor via the computer readable memory.

* * * * *